(12) United States Patent
Mouchet (10) Patent No.: US 8,297,102 B1
(45) Date of Patent: Oct. 30, 2012

(54) APPARATUS AND METHOD FOR TESTING SENSORS

(76) Inventor: Jacques Mouchet, Shanghai (CN)

( * ) Notice: Subject to any disclaimer, the term of this patent is extended or adjusted under 35 U.S.C. 154(b) by 0 days.

(21) Appl. No.: 12/614,371

(22) Filed: Nov. 6, 2009

Related U.S. Application Data (60) Provisional application No. 61/112,167, filed on Nov. 6, 2008.

(51) Int. Cl.
*G01L 27/00* (2006.01)

(52) U.S. Cl. ............................................. 73/1.57; 73/37

(58) Field of Classification Search ................... None
See application file for complete search history.

(56) References Cited

U.S. PATENT DOCUMENTS

| | | | |
|---|---|---|---|
| 6,775,632 | B1 * | 8/2004 | Pollack et al. ................ 702/104 |
| 6,851,288 | B2 * | 2/2005 | Howes ............................ 70/159 |

OTHER PUBLICATIONS

Earth Systems Solutions "Pressure Chambers (Extractors)" retrieved via archive.org. Original Posting date Feb. 22, 2008. URL= http://web.archive.org/web/20080222082524/http://www.earthsystemssolutions.com/assets/extractors.html.*
RF Test System R&S TS7810. Test and Measurement Solutions for the Automotive Industry • PD 5213.6935.62 Version 01.00. pp. 22-24. 2006.*

\* cited by examiner

*Primary Examiner* — Hezron E Williams
*Assistant Examiner* — Mark A Shabman (57) ABSTRACT

A system, apparatus, and method for testing a pressure-based sensor within a test chamber that can include a lock mechanism that is separate from the pressure release mechanism.

20 Claims, 8 Drawing Sheets

APPARATUS AND METHOD FOR TESTING SENSORS

RELATED APPLICATIONS

This utility patent application claims priority to the U.S. provisional patent application titled "SYSTEM, APPARATUS, AND METHOD FOR TESTING SENSORS" (Ser. No. 61/112,167) that was filed on Nov. 6, 2008, the contents of which are hereby incorporated by reference in their entirety.

BACKGROUND OF THE INVENTION

The invention relates generally to sensors. More specifically, the invention is an apparatus and method for testing pressure-based sensors (collectively the "apparatus"), including but not limited to the sensors used as part of a tire pressure monitoring system ("TPMS").

Automated technologies can significantly enhance the quality of life of consumers and increase the efficiency of businesses. However, the potential value of automated technologies such as TPMS and other sensor-dependent systems is often compromised by the inability of consumers, businesses, and service personnel to evaluate and test whether or not a particular sensor is functioning properly. Technology can in theory provide all sorts of wonderful functions, but monitoring and maintaining such systems can prove challenging, and such challenges can impede the adoption of automated technology as well as impede the proper use of such technologies. An automated technology that performs functionality based on the output of a faulty sensor can often be more burdensome in that particular context than non-use of the automated technology.

Automated technologies are often purposely opaque to the user because the point of automated technology is to perform certain functions without human intervention. The disadvantage of automated technology that is encapsulated in such a way as to be opaque to the user is that defects can be both hard to detect and difficult to remedy.

Malfunctioning technologies can also have a negative impact on the value of the technology when even in those instances when it does function properly. Numerous false alarms make it far more likely than an actual alarm condition will be ignored. The weakness of sensor-based systems is that as sophisticated as they may be, such systems are still susceptible to the problem of "garbage in" resulting in "garbage out."

SUMMARY OF THE INVENTION

The invention relates generally to sensors. More specifically, the invention is an apparatus and method for testing pressure-based sensors (collectively the "apparatus"), including but not limited to the sensors used as part of a monitor tire pressure system ("TPMS").

The apparatus can provide for a quick, safe, portable, and inexpensive way to test pressure-based sensors such as sensors incorporated into a TPMS application in a vehicle.

The system can be more fully understood upon reading the accompanying drawings that are discussed briefly below.

BRIEF DESCRIPTION OF THE DRAWING

The following drawings illustrate different examples and embodiments of the system.

The system can be more fully understood upon reading the following detailed description.

DETAILED DESCRIPTION

The invention relates generally to sensors. More specifically, the invention is an apparatus and method for testing pressure-based sensors (collectively the "apparatus"), including but not limited to the sensors used as part of a monitor tire pressure system ("TPMS").

I. Overview

Figure 1:
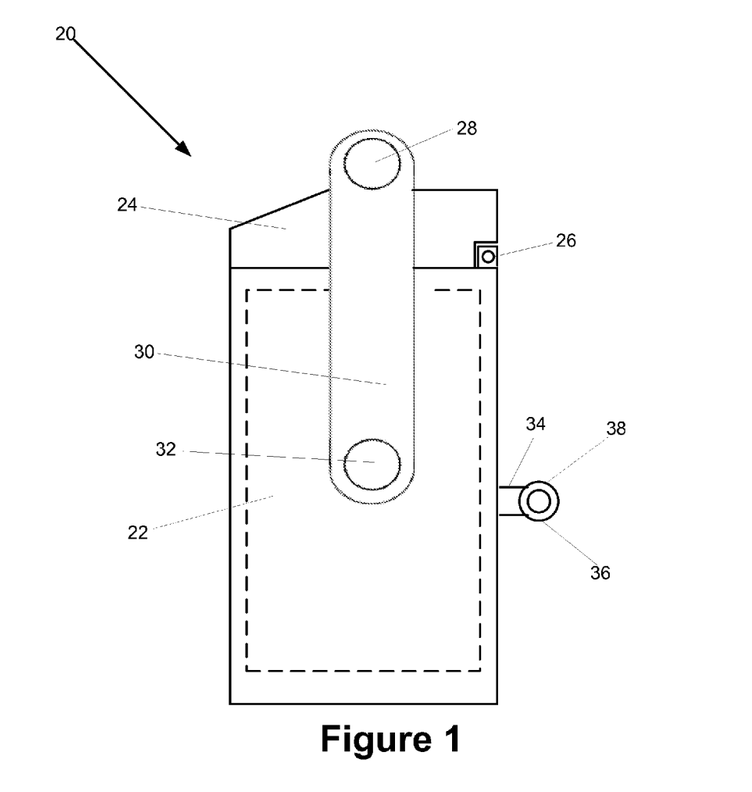
FIG. 1 is block diagram illustrating an example of side view of the apparatus in a state of being fully closed and locked.

FIG. 1 is block diagram illustrating an example of side view of the apparatus 20 in a state of being fully closed and locked.

The apparatus 20 can be implemented in a wide variety of different embodiments. The shape of the apparatus 20, the material composition of the apparatus 20, the size of the apparatus, 20 and the attributes of the various components and subcomponents of the apparatus 20 can vary widely from embodiment to embodiment.

The apparatus 20 can be used to quickly and safely test pressure-based sensors 40, including the TPMS sensors used to measure tire pressure in various vehicles. Sensor-based systems are dependent upon accurate sensor 40 readings in order to function properly. By providing users with the ability to safely, quickly, accurately, and inexpensively create a pressurized test chamber 22, the apparatus 20 provides users with the ability to safely, quickly, accurately, and inexpensively test pressure-based sensors 40.

The apparatus 20 allows users to pressurize a chamber 22 within the apparatus 20 in order to test pressure-based sensors 40. The apparatus 20 can be configured to make it impossible for the apparatus 20 to explode from too much internal pressure. A safety release 38 can be used to automatically relieve internal pressure within the chamber 22 once such pressure exceeds a predefined threshold value. For example, in the context of testing TPMS sensors the safety release 38 can be configured to release the air within the chamber 22 when the pressure reaches a value between 40 psi and 45 psi (values in excess of any target tire pressure). The safety release 38 of the apparatus can be implemented in such a way to generate an audible "pop" sound to alert the user of the apparatus 20 that air has in fact been released from the chamber 22.

The apparatus 20 can be implemented in such a manner as to be highly portable. For example, TPMS sensors 40 are relatively small and light. Embodiments of the apparatus 20 that are configured for the purpose of testing TPMS sensors 40 can be sized to accommodate such sensors 40 while being smaller and lighter than moderate sized toolbox.

Many embodiments of the apparatus 20 can include a lever 30 and handle 28 that provide for the quick closing and release of the apparatus 20 with respect to the sensor 40 application being tested. In many embodiments, the apparatus 20 is embodied in a highly portable testing box that can be used to evaluate the proper functioning of a pressure based sensor 20 application, such as a TPMS sensor 40. Such embodiments can include a quick close and release lever 30 and handle 28 to facilitate safe, easy, accurate, and quick use.

Many prior art approaches to sensor 40 testing involve testing chambers that involve slow and difficult to manipulate closing devices. In many instances, the closing devices are dangerous to open under pressurized conditions.

Use of the apparatus 20 can enhance the ability of service personnel to safely and quickly test pressure-based sensors 40. In the context of a TPMS application in a vehicle such as an automobile, use of the apparatus 20 can allow the local tire shop, mechanic, or even skilled consumers to safely and quickly test the TPMS sensors 40 before the assembly or re-assembly of the TPMS in the rim and tire of the wheel.

Figure 2:
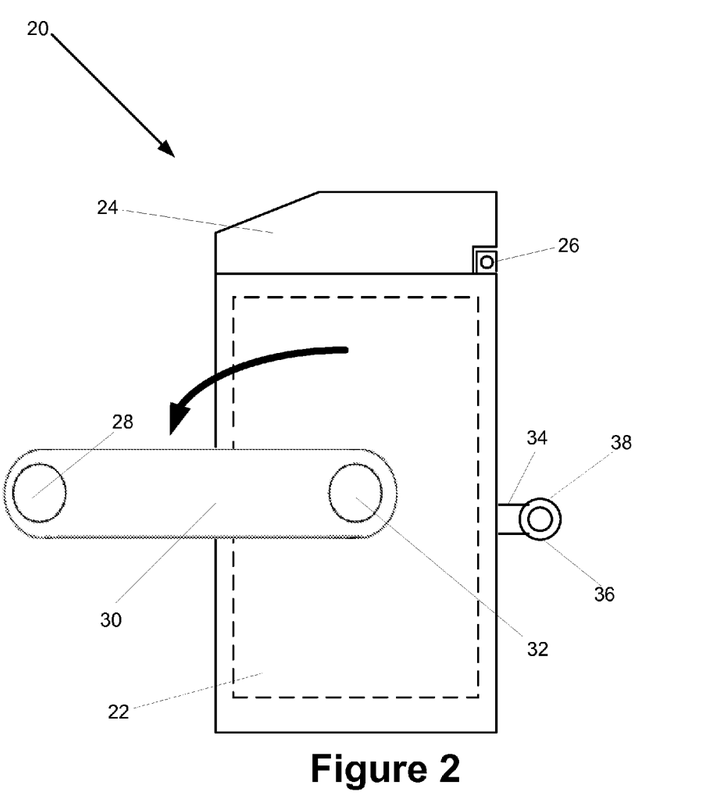
FIG. 2 is block diagram illustrating an example of a side view of the apparatus in a state of being fully closed but unlocked.
Figure 3:
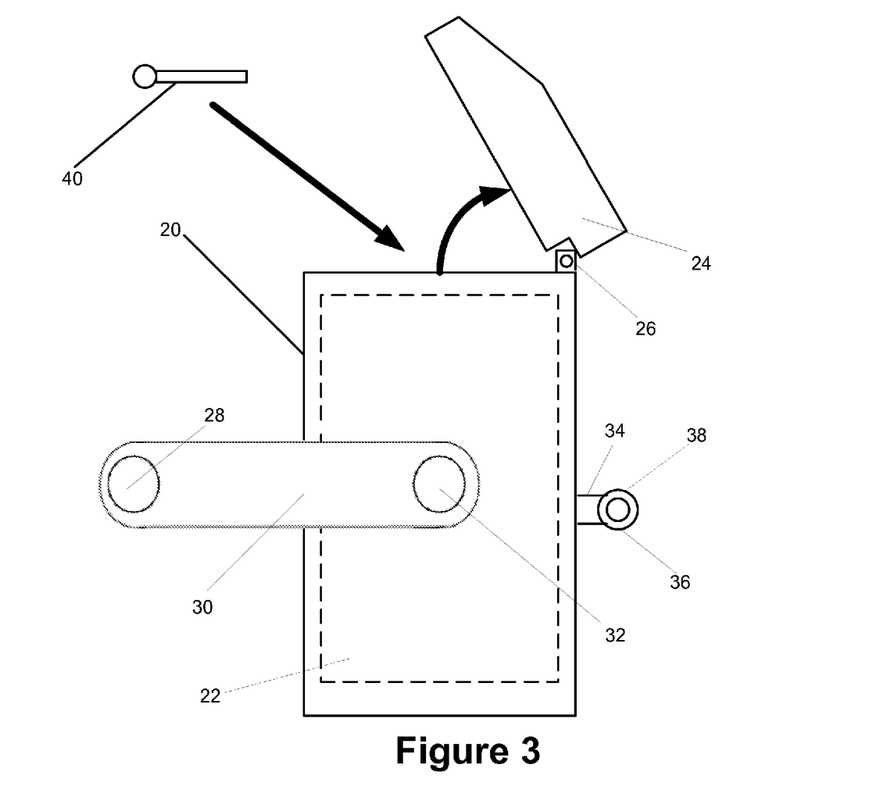
FIG. 3 is a block diagram illustrating an example of a side view of the apparatus in a state of being open and unlocked.

Examples of three important "states" (locked/closed, unlocked/closed, and unlocked/open) of the apparatus 20 are illustrated in FIGS. 1-3. The sensor 40 can be placed in the box or chamber 22 (see FIG. 3). After the apparatus 20 is closed (see FIG. 2), the levers 30 can be rotated so that the lever handle or lock 28 is over the cover 24 (see FIG. 1). Upon locking, the sensor 20 is then ready to be tested by the safe application of pressure inside the box.

II. Components and Configurations

As indicated above, the apparatus 20 can be implemented in a wide variety of different configurations using a wide variety of different components and subcomponents.

A. Chamber

The chamber 22 is typically not visible from outside the apparatus 20 when the apparatus 20 is in a closed state. Thus, the chamber 22 is illustrated using dotted lines within FIG. 1. The shape and size of the chamber 22 is constrained by the shape and size of the apparatus 20. The thickness of the walls of the apparatus 20 surrounding the chamber 22 will typically depend on the operational pressure limits of the particular apparatus 20. In some embodiments of the apparatus 20, the internal walls surrounding the chamber 22 can be made of a different material than the exterior walls of the apparatus 20 itself. In other embodiments, the interior wall surrounding the chamber 22 are indistinguishable from the outer surface of the apparatus 20. A wide range of materials can be incorporated in the apparatus 20 and the walls surrounding the chamber 22. Metals, alloys, plastics, ceramics, hybrid compositions, and virtually any type and configuration of material(s) capable of supporting a pressurized environment within the chamber 22 can be incorporated into the apparatus 20.

Different embodiments of the apparatus 20 may include specific structures or components within the chamber 22 designed to fasten the sensor 40 into a fixed position or to otherwise facilitate the testing of the applicable sensor 40.

FIG. 3 illustrates an example of an apparatus 20 with an open cover 24 to allow the placement of a pressure-based sensor 40 into the chamber of the apparatus 20.

B. Cover

Returning to FIG. 1, the chamber 22 is empty space into which a pressure-based sensor 40 is placed. As discussed above, many of the boundaries of the chamber 22 are typically constrained by the dimensions of the apparatus 20. Such boundaries are fixed regardless of what "state" the apparatus 20 is current in. One boundary that is not fixed, and instead is dependent upon the "state" of the apparatus 20 is the top surface of the chamber 22. In order for the chamber 22 to be used as test area for pressure-based sensors 40, there needs to be some type of movable surface or "door" that can be opened to allow the placement of the sensor 40 and then closed to allow for the pressurization of the chamber 22.

The top boundary to the chamber 22 is the bottom surface of a cover 24. The cover 24 can be implemented in a wide variety of different shapes, sizes, and material compositions. Although the bottom surface of the cover 24 is substantially flat in the example provided in FIG. 1, alternative surface configurations can be incorporated into the apparatus 20.

In an embodiment of the apparatus 20 for which the lock 28 is implemented in the form of a roller, the top surface of the cover will typically involve a sloped surface to facilitate the rolling up and down of the lock 28.

The cover 24 itself can use a variety of mechanisms to support the opening and closing of the cover 24. In FIG. 1, a hinge 26 (i.e. cover hinge) is used to facilitate the opening and closing of the cover 24. In other embodiments, different mechanisms can be used to provide for the transition of the cover 24 between open, closed, and partially open/partially closed states.

The cover 24 can also be referred to as a top, cap, lid, or seal. FIG. 3 illustrates an example of the cover 24 in a state of being opened or at least partially open.

C. Cover Movement Mechanism

Returning to FIG. 1, a variety of different movement mechanisms can be used to transition the apparatus 20 between the various states of open, closed, and partially open/partially closed. In FIG. 1, the cover movement mechanism is a hinge 26, but virtually any mechanism or mechanism configuration capable of opening and closing the cover could be used. Sliders, rails, hinges, pivots, and virtually any other mechanism capable of supporting the motion of a cover can be incorporated into the apparatus 20.

In the example of FIG. 1 and in many embodiments of the apparatus 20, the mechanism for opening/closing the cover 24 is different, distinct, and independent of the mechanism for locking the cover 24 into a closed state. In some embodiments, the open/close mechanism may also serve as the lock mechanism.

D. Lock

A lock 28 is any mechanism or combination of mechanisms used by the apparatus 20 to "lock" or fasten the cover into a closed state so that the chamber 22 can be successfully and safely pressurized. In the example of FIG. 1, the lock 28 is a cylindrical roller. In other embodiments, different types of lock mechanisms can be used.

Some embodiments of the apparatus 20 can include additional structural components on the top surface of the cover 24 to hold the lock 28 into place. For example, ridges on the surface of the cover 24 could enhanced to fixed status of the lock 28.

The lock 28 can also be referred to as a handle, roller, lock, or fastener for the cover 24 of the apparatus 20. As illustrated in FIG. 2, the status of the lock 28 can be changed from locked to unlock through the use of the lever 30.

Different embodiments of the apparatus 20 can involve a different number of locks 28 that are comprised of a variety of different materials.

E. Lock Movement Mechanism

A lock movement mechanism 30 is the component of the apparatus 20 that facilitates the transition of the apparatus 20 between the states of locked and unlocked. In the example of FIG. 1, the lock movement mechanism 30 is a lever 30, but a variety of different lock movement mechanisms can be incorporated into the apparatus 20. Although there are two levers 30 in the example of FIG. 1 (with only one lever being visible), other embodiments of the apparatus 20 can involve as few as one lock movement mechanisms 30 or conversely, three or more lock movement mechanisms 30.

Different embodiments of the apparatus 20 can include a variety of different lock movement mechanisms 30. In the example of FIG. 1, the roller 24 is configured to roll off the top of cover 24. FIG. 2 reveals the same example of the apparatus 20, with the only difference between the figures being the "locked" status of the apparatus 20 (FIG. 1 is locked while FIG. 2 is unlocked).

The lock mechanism illustrated in FIG. 1 involves a cover (which can also be referred to as an upper cap) 24 that is locked by rotating the roller 28 over the cover 24. The rotating of the lever handle 28 involves pushing the rotation of the cylinder 28 until it locks. Different embodiments of the apparatus 20 can involve significantly different lock mechanisms 28.

F. Lock Movement Constraint Mechanism

Figure 4:
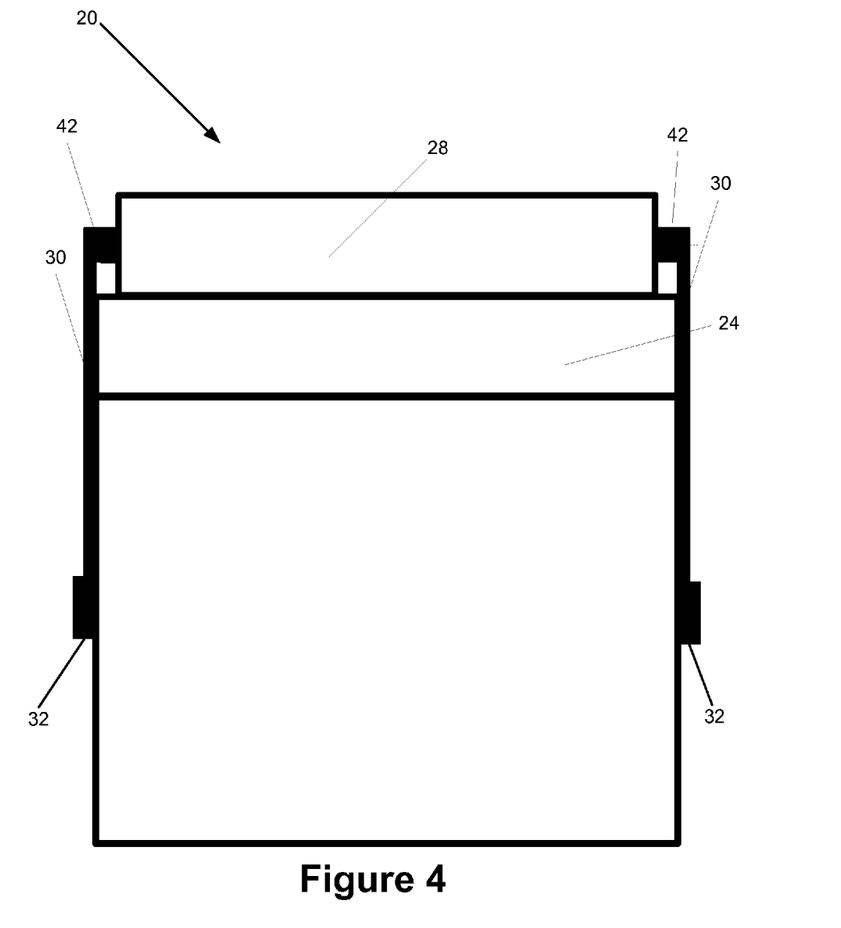
FIG. 4 is a block diagram illustrating an example of a front view of the apparatus in a state of being fully closed and locked.

Many embodiments of the apparatus 20 will include a lock movement constraint mechanism 32, a component that serves to constrain or shape the motion of the lock movement mechanism 30. In the example of FIG. 1, two lever pivots 32 (only one is visible) constrain the motion of the levers 30. Different embodiments of the apparatus 20 can include different numbers and types of lock movement constraint mechanisms. FIG. 4 illustrates a symmetrical use of two levers 30 and two lever pivots 32.

G. Exterior Access Point

When the apparatus 20 is in a closed and locked state, the apparatus 20 is configured to facilitate the pressurization of the chamber 22. The pressurization of the chamber 22 is configured to occur through one or more exterior access points 34. In the example of FIG. 1, the exterior access point 34 is a pipe or tube extending in an outward direction from the boundary of the chamber 22. Different embodiments of the apparatus 20 will involve different sizes, shapes, and material compositions of exterior access points 34.

In a preferred embodiment, there is typically only one exterior access point 34 and such exterior access point 34 is only long enough to be usable. The exterior access point 34 can also be referred to as an exterior tube, an exterior passageway, an exterior pipe, or an exterior knob.

The exterior access point 34 is often located on the side of the apparatus 20 that is opposite to the side of the apparatus 20 to which the lever 30 moves. As illustrated in FIGS. 1 and 2, position of the roller 28 in an unlocked state is opposite to the exterior access point 34. Alternative configurations can be implemented, but it is often desirable to configure the motion of the levers 30 and roller 28 to avoid the exterior access point 34.

Figure 5:
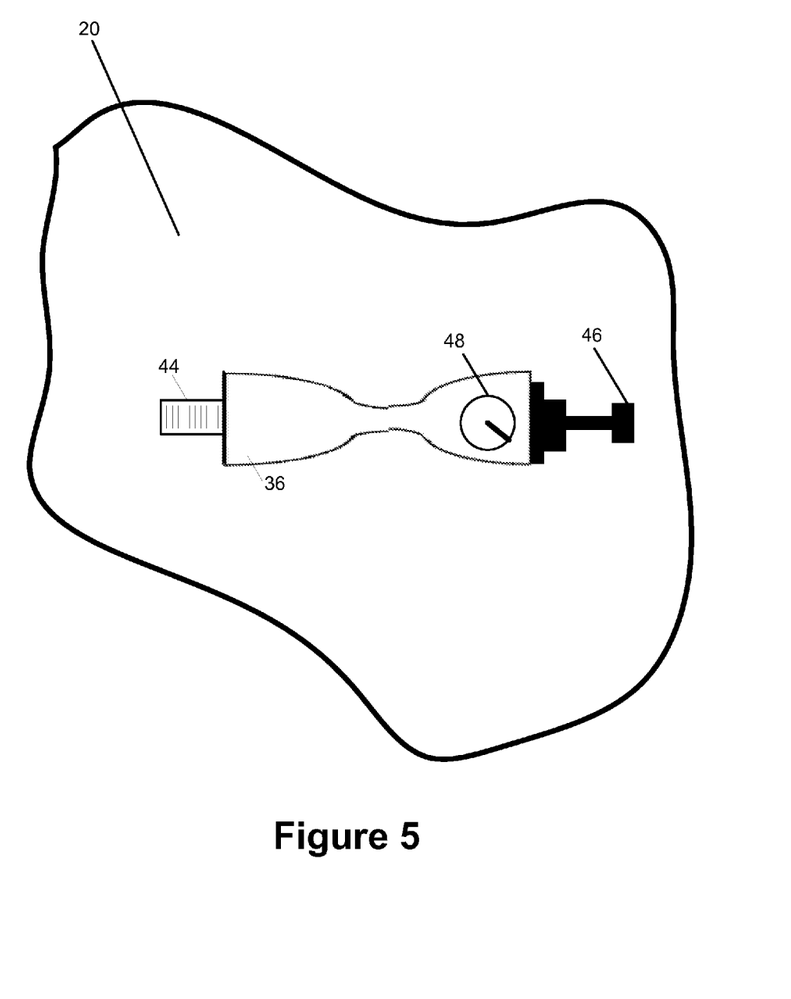
FIG. 5 is a block diagram illustrating a partial example of a rear view of the apparatus.

FIG. 5 provides a view of the exterior access point 34 and some examples of the various components of apparatus 20 that can be attached to the exterior access point 34

H. Input Component with Nozzle

In order to pressurize the chamber, an air compressor or similar device can be attached to a nozzle 44 (which is threaded in the example of FIG. 5) of an input point 36 (which can also be referred to as an input component 36). In the example of FIG. 5, the input component 36 extends in the opposite direction from the exterior access point 34 from a safety release 46 and sensor 48. In other embodiments, different arrangements and configurations can be incorporated into the apparatus 20.

I. Output Component with Safety Release and Sensor

Opposite to the input component 36 extending from the exterior access point 34 is the output component. The output component can include a safety release 46 configured to release air and relieve internal pressure should the pressure of the chamber 22 exceed some predetermined threshold. For example, in a TPMS embodiment of the apparatus 20, there is no reason to inflate a tire beyond 40 psi, so the safety release 46 component can be configured to release air once that threshold is reached. The activation of the safety release 46 can be configured to generate a "popping sound" or some other indication that would be helpful to notify users that the safety release 46 had in fact activated. Different embodiments of the apparatus 20 can incorporate different thresholds for the activation of the safety release 46.

Some embodiments of the apparatus 20 may include a sensor such as a pressure sensor 48 for the purposes of monitoring air pressure within the chamber 22.

J. Roller Pivots

As illustrated in FIG. 3, embodiments of the apparatus 20 that involve a roller 28 as the lock mechanism 28 can utilize roller pivots 42 to both facilitate and restrain the roller 28. In some embodiments, the roller pivots 42 may provide for the free rotation of the roller 28. In some embodiments, the rotation may only be partially free. In still other embodiments, little or no rotation can be permitted.

III. Views of the Apparatus

The apparatus 20 can be implemented in a wide variety of different configurations. The drawings illustrate certain embodiments of the apparatus 20, but the apparatus 20 can be implemented in many different ways that are not illustrated in the Figures.

FIG. 1 is block diagram illustrating an example of side view of the apparatus 20 in a state of being fully closed and locked. FIGS. 1, 2, and 3 illustrated a sequence of an apparatus 20 going from a state of locked and close (FIG. 1), to a state of unlocked and closed (FIG. 2), to a state of unlocked and open or at least partially open (FIG. 3).

FIG. 2 is block diagram illustrating an example of a side view of the apparatus 20 in a state of being fully closed but unlocked.

FIG. 3 is a block diagram illustrating an example of a side view of the apparatus 20 in a state of being open and unlocked.

FIG. 4 is a block diagram illustrating an example of a front view of the apparatus 20 in a state of being fully closed and locked.

FIG. 5 is a block diagram illustrating a partial example of a rear view of the apparatus 20. This is the opposite side to the view illustrated in FIG. 4.

Figure 7:
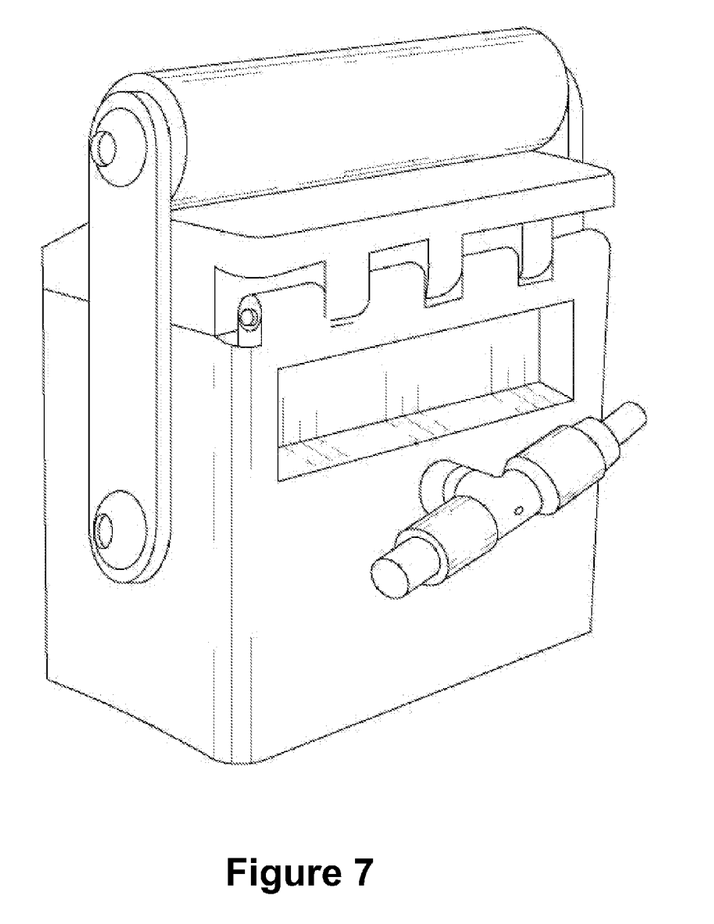
FIG. 7 is block diagram illustrating an example of a perspective view of the rear of the apparatus.

FIG. 7 is block diagram illustrating an example of a perspective view of the rear of the apparatus 20.

Figure 8:
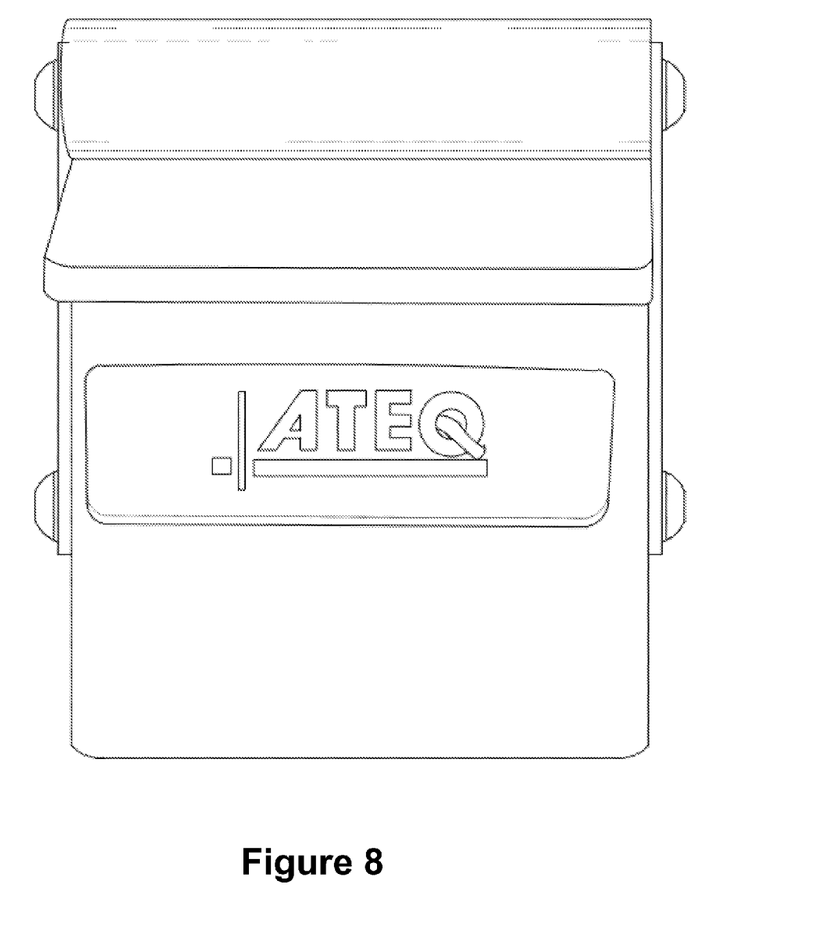
FIG. 8 is a block diagram illustrating an example of a front view of the apparatus.

FIG. 8 is a block diagram illustrating an example of a front view of the apparatus 20.

IV. Method of Using

Figure 6:
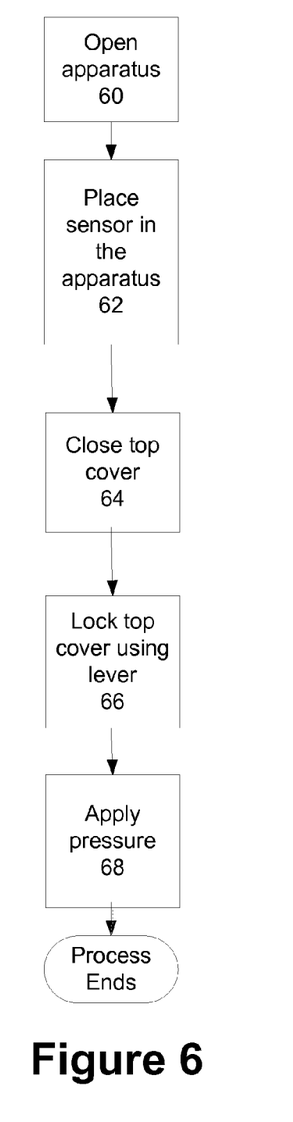
FIG. 6 is a flow chart diagram illustrating an example of a process for testing pressure-based sensors.

FIG. 6 is a flow chart illustrating a process-flow view of an example of using the apparatus 20.

At 60, the apparatus 20 is opened. This can be as simple as manually lifting the cover 24. As discussed above, a wide variety of different cover movement mechanisms 26 can be utilized to facilitate the movement of the cover 24. In some embodiments, the opening and closing of the apparatus 20 through the lifting or movement of the cover 24 is achieved through powered means.

At 62, one or more sensors 40 are placed within the chamber 22 of the apparatus 20. As discussed above, certain embodiments of the apparatus 20 may include special components within the chamber 22 that require being hooked up the applicable sensor 40 in the appropriate manner.

At 64, the cover 24 is closed. The apparatus 20 is thus transitioned from a state of "open" to a state of "closed/unlocked".

At 66, the apparatus 20 is locked. In the embodiment illustrated FIG. 1, this can involve rolling the roller 28 up onto the top of the cover 24 until it reaches a locked position. In some embodiments of the apparatus 20, various indentations, ridges, or other structures are included at the top of the cover 24 to enhance the fastening of the lock mechanism 28.

At 68, the chamber is pressurized, allowing the sensor 40 to be tested. At discussed above, a safety release 46 can be configured to activate upon reaching a predefined pressure or pressure range within the chamber 22. In a TPMS embodiment of the apparatus 20, it is generally desirable for the safety release 46 to activate upon reaching a chamber pressure between 40 psi and 45 psi.

V. Alternative Embodiments

In accordance with the provisions of the patent statutes, the principles and modes of operation of this invention have been explained and illustrated in preferred embodiments. However, it must be understood that this invention may be practiced otherwise than is specifically explained and illustrated without departing from its spirit or scope.

The apparatus 20 can be implemented in a wide variety of different embodiments involving a wide variety of different components and configurations. A wide variety of different materials can be used to construct the components and different functional specifications can be incorporated into the performance of the apparatus 20 as desired.

For example, in a TPMS embodiment of the apparatus 20, the apparatus 20 can be configured to safely release the pressure starting between 40 and 45 psi making it impossible for the apparatus 20 to explode or otherwise violently open due to over pressurization. Different embodiments of the apparatus 20 can involve different safety release thresholds desirable in the particular context. In a TPMS embodiment of the apparatus 20 for use with tire and auto shops, the apparatus 20 can be configured to give an audible "pop" without any danger to the user upon reaching the threshold pressure condition.

Different mechanisms can be incorporated into the apparatus 20 for the purposes of locking the apparatus 20 sensor and potentially fastening the sensor 40 within the chamber 22.

In many embodiments, the locking mechanism 28 should be independent of the exterior access point 34 so that the function of locking is distinct from the function of pressurization and the function of unlocking is distinct from the function of de-pressurization.

Different mechanisms can be incorporated into the apparatus 20 for the purposes of releasing pressure from the test chamber 22. The release mechanism can involve various different configurations of components that provide for the de-pressurizing of the test chamber 22 within the apparatus 20.

The size and composition of the test chamber 22 can vary widely from embodiment to embodiment, but it should be configured to maintain a pressurized embodiment up or in excess to a predefined threshold pressure, such as 40 psi or 45 psi in a TPMS embodiment of the apparatus 20. Threshold pressure values can be configured to be higher or lower depending on the context. Different embodiments and physical attributes of sensors 40 can be accommodated through variations in the attributes of the test chamber 22 and the system generally.

The apparatus 20 can be used independently or in conjunction with other tools relating to the installation, testing, operation, and maintenance of pressure-based sensors 40, including but not limited to TPMS sensors. For example, the apparatus 20 can be used in conjunction with an electronic module residing in a plastic housing with an OBD II connection to the electronic control unit of the vehicle. It may be desirable in certain circumstances to access and evaluate actual historical pressure data from the TPMS sensors when evaluating whether or not the sensor is functioning properly. Similarly, such an electronic module could provide a portable means to configure the TPMS application on the basis of the functionality of the apparatus 20. For example, if a sensor 40 is consistently underestimating the pressure by a particular magnitude, that information could be used to inform the electronic module that the actual pressure is likely being underestimated by that same magnitude.

The invention claimed is:

1. An apparatus for testing a pressure-based sensor, said comprising:
   a test chamber;
   a hinge;
   a cover attached to said hinge;
   a pivot;
   a lever attached to said pivot;
   a roller attached to said lever; and
   an exterior access point;
   wherein said hinge provides for said cover moving from a closed state to an open state;
   wherein said pivot provides for said roller moving from a locked state to an unlocked state; and
   wherein said exterior access point provides for the pressurization and de-pressurization of said test chamber.

2. The apparatus of claim 1, wherein said test chamber is adapted to hold a TPMS sensor.

3. The apparatus of claim 1, wherein said exterior access point includes a safety release.

4. The apparatus of claim 3, wherein said safety release is automatically configured to activate upon reaching an air pressure level of between about 40 psi and 45 psi within said test chamber.

5. The apparatus of claim 4, wherein a sound is triggered when the safety release is activated.

6. The apparatus of claim 1, wherein said exterior access point is not moved when said cover moves from said closed state to said open state, and wherein said exterior access point is not moved when said pivot moves from said locked state to said unlocked state.

7. The apparatus of claim 1, wherein said exterior access point is not connected to said cover, wherein said roller is positioned above said cover when said pivot is in said locked state, and wherein said roller is positioned to the side of said cover when said pivot is in said unlocked state.

8. The apparatus of claim 1, wherein said external access point includes an input mechanism and a safety release, wherein said safety release is not said input mechanism.

9. The apparatus of claim 8, wherein said input mechanism includes a threaded nozzle, and wherein said external access point is not attached to said cover.

10. The apparatus of claim 1, wherein said cover has a top inclined surface, and wherein said roller is adapted to roll up said top surface when cover is in a closed state.

11. The apparatus of claim 1, wherein said apparatus includes two said pivots, two said levers, and wherein said roller is located above said cover when said apparatus is in said locked state and to the side opposite of said external access point when said apparatus is in said unlocked state.

12. The apparatus of claim 11, wherein said two levers move in parallel with each other, and wherein said roller is position above said cover when said apparatus is in said closed and said locked state.

13. The apparatus of claim 1, wherein said hinge does not provide for said cover being detached from said apparatus.

14. The apparatus of claim 1, further comprising an electronic module for the storage, analysis, and communication of test results, wherein said apparatus is adapted for the testing of TPMS sensor.

15. The apparatus of claim 1, wherein said apparatus further includes a sensor attached to said exterior access point.

16. The apparatus of claim 1, wherein there is a exterior surface of the test chamber is the same composition as the exterior surface of the apparatus.

17. An apparatus, comprising:
a test chamber configured to hold one or more TPMS sensors and to be pressurized through an external access point;
a cover configured to be closed over said test chamber when said apparatus is pressurized through said external access point, wherein said external access point is not attached to said cover;
a hinge facilitating the motion of said cover, wherein said hinge is adapted to prevent the separation of said cover from said apparatus;
a roller configured to be on top of said cover when said cover is locked;
a plurality of levers connected to said roller;
a plurality of pivots connected to said levers, said levers adapted to permit the rotational motion of said levers; and
said external access point.

18. The apparatus of claim 17, wherein said external access point includes a safety release that is automatically activated when a pressure within said test chamber reaches at least about 40 psi, and wherein activation of said safety release triggers a noise indicator.

19. The apparatus of claim 18, wherein said external access point further includes a threaded nozzle and a sensor.

20. A method for testing a pressure-based sensor, comprising:
placing the sensor in a test chamber of a portable test apparatus;
closing the cover;
locking the cover in a closed position by rotating a lever upwards so that a roller is adjacent to a top surface of the cover; and
pressurizing the test chamber through an external access point that is separate from the cover and roller.

* * * * *